R. H. FORDYCE.
DISK SHARPENER.
APPLICATION FILED APR. 30, 1915.
1,163,994.
Patented Dec. 14, 1915.
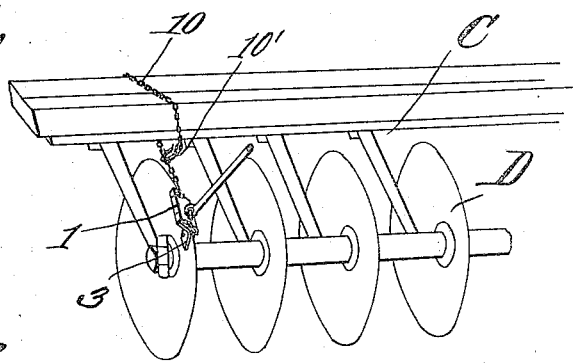
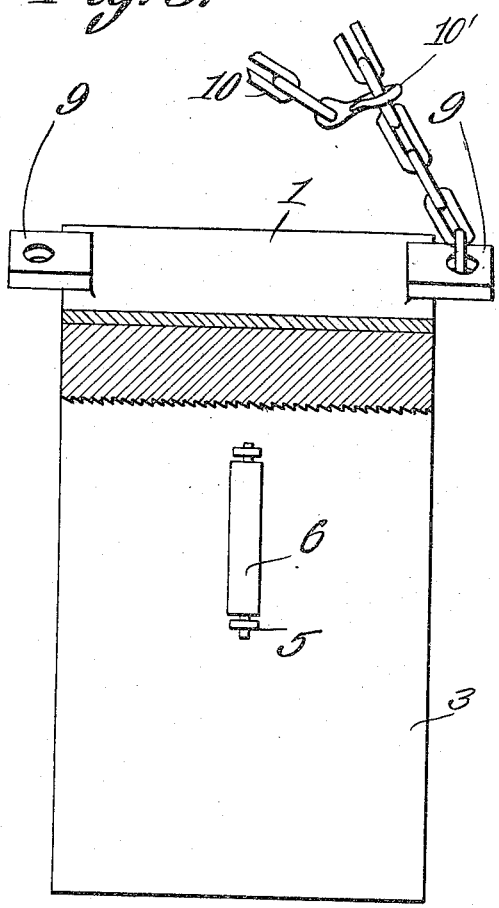
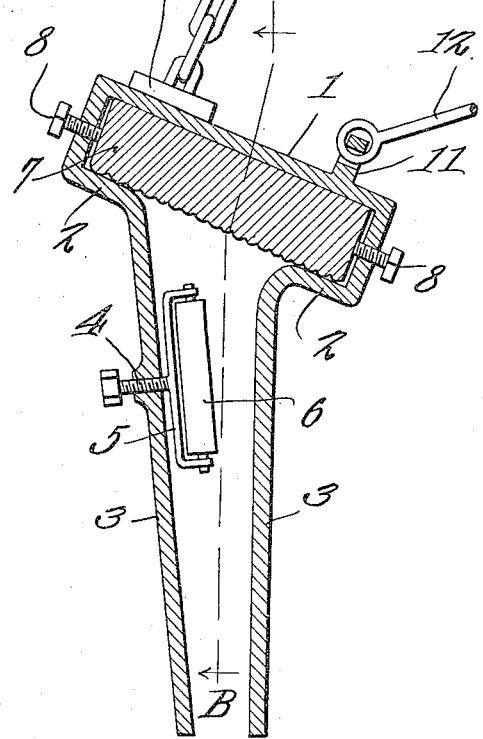

UNITED STATES PATENT OFFICE.

ROY H. FORDYCE, OF BETHANY, MISSOURI.

DISK-SHARPENER.

1,163,994.　　　Specification of Letters Patent.　　Patented Dec. 14, 1915.

Application filed April 30, 1915. Serial No. 24,975.

*To all whom it may concern:*

Be it known that I, ROY H. FORDYCE, a citizen of the United States, residing at Bethany, in the county of Harrison and State of Missouri, have invented a new and useful Disk-Sharpener, of which the following is a specification.

This invention relates to a sharpener for cultivator disks such as used in connection with disk harrows, one of the objects of the invention being to provide a sharpener adapted to be applied to the disks while the harrow or cultivator is in operation so as thus to maintain the disks in a sharp condition without the necessity of removing the machine from the field for the purpose of sharpening the parts, thus effecting a considerable saving of time.

A further object is to provide a sharpening device which is simple, compact, durable, can be readily applied, and is cheap to manufacture.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a perspective view of a portion of a disk harrow or cultivator, showing the sharpening attachment applied to one of the disks. Fig. 2 is an enlarged transverse section through the sharpener. Fig. 3 is a section on line A—B Fig. 2.

Referring to the figures by characters of reference C designates a portion of a cultivator or harrow structure, under which is arranged a gang of disks D of the usual form. The attachment adapted to be used in connection with the disks includes a yoke 1 which is inverted and has its sides inturned as at 2, each of these inturned portions merging into a depending tongue 3. The tongues are spaced apart so as to receive between them a portion of the disk to be sharpened and the yoke 1 is inclined relative to the tongues 3. One of the tongues is thus longer than the other and this long tongue has an adjusting screw 4 extending therethrough and swiveled within a yoke 5 in which is journaled a roller 6.

A sharpening file 7 is seated in the yoke 1 and rests upon the inturned portions 2, there being binding screws 8 extending through the sides of the yoke 1 and adapted to bear against the respective sides of the file, thus to hold the file fixed relative to the yoke 1.

Ears 9 extend from the yoke 1 near one side thereof either one being adapted to be engaged by a supporting chain 10 or the like extending around the harrow structure C, there being a hook 10′ on the chain for fastening it in place. Another ear 11 extends from the yoke 1 near the other side thereof and is engaged by a rod or handle 12 which extends preferably to a point close to the driver's seat so that it can be grasped by the driver and used as a means for pressing the sharpener tightly against the disk being acted on or to disengage the sharpener from the disk.

In using the device herein described, it is first suspended from the harrow structure by means of the flexible connection 10, after which the upper portion of the disk to be sharpened is inserted between the tongues 3 so that the roller 6 will bear upon the concave face of the disk. This roller can be adjusted toward or from the disk so as to cause the file or other sharpening element 7 to rest upon the periphery of the disks D at any desired inclination. The operator by pressing against the rod or handle 12, causes the roller 6 to press against the concave face of the disk and also forces the active face of the element 7 against the peripheral portion of the disk. This operation takes place while the harrow or cultivator is in use so that, during the rotation of the disk, the edge thereof will be sharpened.

The device can be quickly detached and reversed so as to engage an opposed disk, the chain being placed in the outer ear 9.

It is to be understood that the part 7 can be in the form of a file, stone or any other suitable sharpening element.

What is claimed is:—

1. The combination with a holder, said holder having a disk receiving portion extending therefrom, of a diagonally disposed sharpening element within the holder and extending across said disk receiving portion, and means mounted within the disk receiving portion for engaging one side of the inserted disk.

2. The combination with a disk cultivator, of means for sharpening the disks of the cultivator, said means including a sharpening element, a holder therefor, flexible means connected to the holder for supporting it from the cultivator structure, means depending from the holder for receiving a portion of the disk therebetween to hold the sharpening element against lateral displacement relative to the disk, adjustable means below the sharpening element for engaging one face of the disk, and means adapted to be actuated by the operator for thrusting the sharpening element against the periphery of the disk.

3. A sharpening attachment for disk cultivators and the like, including an inverted yoke having inturned sides, a sharpening element detachably secured within the yoke and supported by said inturned sides, tongues depending from the inturned sides, an anti-friction device adjustably connected to one of the tongues for engaging one side of the disk between the tongues, flexible supporting means connected to one side portion of the yoke, and a handle connected to the other side portion thereof.

In testimony that I claim the foregoing as my own, I have hereto affixed my signature in the presence of two witnesses.

ROY H. FORDYCE.

Witnesses:
CARLTON S. WINSLOW,
C. H. POTTER.

Copies of this patent may be obtained for five cents each, by addressing the "Commissioner of Patents. Washington, D. C."